United States Patent
Bullinger et al.

(10) Patent No.: US 7,908,059 B2
(45) Date of Patent: Mar. 15, 2011

(54) MOTOR VEHICLE HAVING A PREVENTIVE ACTION PROTECTION SYSTEM

(75) Inventors: Wilfried Bullinger, Korntal-Muenchingen (DE); Karl Moehle, Stuttgart (DE); Alfred Wagner, Gomaringen (DE)

(73) Assignee: Daimler AG, Stuttgart (DE)

( * ) Notice: Subject to any disclaimer, the term of this patent is extended or adjusted under 35 U.S.C. 154(b) by 425 days.

(21) Appl. No.: 11/659,185

(22) PCT Filed: Jul. 30, 2005

(86) PCT No.: PCT/EP2005/008289
§ 371 (c)(1),
(2), (4) Date: Nov. 14, 2008

(87) PCT Pub. No.: WO2006/015747
PCT Pub. Date: Feb. 16, 2006

(65) Prior Publication Data
US 2010/0063685 A1 Mar. 11, 2010

(30) Foreign Application Priority Data
Aug. 4, 2004 (DE) .......................... 10 2004 037 704

(51) Int. Cl.
*B60R 22/00* (2006.01)
(52) U.S. Cl. .......................................... 701/45; 280/734
(58) Field of Classification Search .................... 701/45; 180/273; 280/734; 700/50; 706/52
See application file for complete search history.

(56) References Cited

U.S. PATENT DOCUMENTS

| | | | |
|---|---|---|---|
| 5,936,549 A | 8/1999 | Tsuchiya | |
| 6,037,860 A | 3/2000 | Zander et al. | |
| 6,169,945 B1 | 1/2001 | Bachmaier | |
| 6,374,168 B1* | 4/2002 | Fujii | 701/45 |
| 6,711,485 B2* | 3/2004 | Feser et al. | 701/45 |
| 6,725,141 B2* | 4/2004 | Roelleke | 701/45 |
| 6,727,844 B1 | 4/2004 | Zimmermann et al. | |
| 6,851,504 B2 | 2/2005 | Campbell et al. | |
| 6,859,731 B2 | 2/2005 | Takafuji et al. | |
| 2003/0154010 A1 | 8/2003 | Rao et al. | |
| 2003/0187578 A1 | 10/2003 | Nishira et al. | |
| 2004/0102882 A1* | 5/2004 | Sala et al. | 701/45 |
| 2005/0004719 A1 | 1/2005 | Dickmann et al. | |

(Continued)

FOREIGN PATENT DOCUMENTS

DE 197 24 101 A1 12/1998

(Continued)

OTHER PUBLICATIONS

International Search Report dated Oct. 21, 2005 and Form PCT/ISA/237 with English translation of relevant portions (Seventeen (17) Pages).

(Continued)

*Primary Examiner* — Mark Hellner
(74) *Attorney, Agent, or Firm* — Crowell & Moring LLP

(57) ABSTRACT

A motor vehicle, such as a passenger car, having a preventive action protection system is provided, which includes safety devices which are actuated as a function of features which are based on input variables from a safety sensor system in a data evaluation and control device, wherein, when a critical driving state is detected, the data evaluation and control device actuates at least one safety device which is assigned to the driving state. The features are each assigned a specific weighting relating to the criticality of the driving state.

14 Claims, 3 Drawing Sheets

U.S. PATENT DOCUMENTS

| | | |
|---|---|---|
| 2005/0252708 A1 | 11/2005 | Theisen |
| 2006/0076178 A1 | 4/2006 | Eberle et al. |
| 2006/0145463 A1* | 7/2006 | Isaji et al. .................... 280/806 |

FOREIGN PATENT DOCUMENTS

| | | |
|---|---|---|
| DE | 197 41 631 A1 | 3/1999 |
| DE | 198 11 865 A1 | 9/1999 |
| DE | 199 56 288 A1 | 6/2000 |
| DE | 199 15 002 A1 | 10/2000 |
| DE | 199 38 891 A1 | 2/2001 |
| DE | 199 49 409 A1 | 4/2001 |
| DE | 101 21 386 C1 | 8/2002 |
| DE | 101 32 386 A1 | 1/2003 |
| DE | 102 02 908 A1 | 7/2003 |
| DE | 103 01 290 A1 | 8/2003 |
| DE | 102 12 963 A1 | 10/2003 |
| DE | 102 23 363 A1 | 10/2003 |
| DE | 103 26 431 A1 | 1/2005 |
| EP | 0 862 059 A1 | 9/1998 |
| JP | 10-59120 | 3/1998 |
| JP | 2000-177616 | 6/2000 |
| JP | 2001-294118 | 10/2001 |
| JP | 2003-525155 | 8/2003 |
| JP | 2004-86289 | 3/2004 |

OTHER PUBLICATIONS

German Search Report dated Feb. 24, 2005 with English translation (Eight (8) Pages).

\* cited by examiner

MOTOR VEHICLE HAVING A PREVENTIVE ACTION PROTECTION SYSTEM

CROSS REFERENCE TO RELATED APPLICATIONS

This application is a national stage of PCT International Application No. PCT/EP2005/008289, filed Jul. 30, 2005, which claims priority under 35 U.S.C. §119 to German Patent Application No. 10 2004 037 704.9, filed Aug. 4, 2004, the entire disclosures of which are herein expressly incorporated by reference.

BACKGROUND AND SUMMARY OF THE INVENTION

The present invention relates to a motor vehicle having a preventive action protection system.

Motor vehicles, in particular passenger cars, are usually equipped with active and passive safety devices which permit the driver to control his vehicle better, even in critical situations, and thus possibly avoid being involved in an accident. If a collision occurs, such safety devices also help to reduce the severity of the accident.

Preventive safety devices which are already active before a possible collision and use a pre-crash phase (i.e., a period of time starting from the detection of a high probability of a collision by appropriate detection systems in the vehicle up to the actual impact) to enhance the vehicle occupant protection with additional safety measures, and thus lessen the severity of an accident, are referred to as preventive action protection systems or so-called PRE-SAFE™ systems. To detect possible accident situations, preventive action protection systems use information from various sensor devices of the motor vehicle. The sensor devices make up a component of another electronic driving stability program and/or a component of a distance sensor system. Depending on the detected situation, conclusions are drawn about a possible accident. Appropriate measures relating to restraint systems for vehicle occupants and possible protection devices for other parties in an accident, such as pedestrians, are initiated to condition the vehicle for the imminent accident.

An example of the actuation of a reversible vehicle occupant protection means in a motor vehicle is described in German patent DE 101 21 386 C1. The motor vehicle has a reversible vehicle occupant protection system, which can be activated before a collision and thus moved into an effective position. For this purpose, a sensor system is used to acquire driving state data which is monitored for emergency braking, oversteering and understeering. If emergency braking, oversteering and/or understeering is detected, the vehicle occupant protection system is activated, but only if a minimum velocity is exceeded.

Important input variables for a decision as to whether safety devices such as seatbelt pretensioners or airbags are to be placed in a state of increased readiness or triggered is provided in practice by a vehicle surroundings detection device, from which information relating to the positions and relative velocities of objects in the vicinity of the vehicle can be acquired.

Radar sensors are used most frequently to monitor the vicinity of the vehicle.

However, in practice it is also possible to apply opto-electronic sensors of a wide variety of types which operate, for example, with infrared radiation, ultra-violet radiation and microwave radiation. Using image sensors for monitoring the surroundings of the vehicle is also known.

Furthermore, in practice, further input variables which are acquired, for example, for controlling safety and comfort systems such as an electronic driving stability system, are compared with triggering thresholds of the preventive action protection system. Such input variables can be, for example, information which is output by a steering angle sensor, a pedal travel sensor, a brake pressure sensor, wheel speed sensors, acceleration sensors and a yaw rate sensor.

Variables such as acceleration values, which can indicate a hazard situation or emergency situation, can be determined from this information. Such a variable can be a specific variable per se or a driving state or a driver reaction, for example, excessive steering maneuver or emergency braking, formed from a plurality of variables.

Even if selective triggering of suitable safety devices, and thus considerable protection for the vehicle occupant, is possible with such protection systems, the large amount of information which is received in parallel causes difficulties in the data processing and control device in terms of the detection of data which is decisive for a possible crash situation.

In particular, when a collision object is sensed by a vehicle surroundings detection device, reliable definitive information about the imminent accident event is necessary in the shortest possible time before the time when the accident occurs. The often large degree of time-consuming computational complexity with which a plurality of input variables are compared with triggering thresholds in existing systems, under certain circumstances, prevents safety devices for vehicle occupants or other parties to a collision from being actuated in a way which is appropriate for the situation before the vehicle experiences an impact.

An object of the present invention is to provide a motor vehicle with a preventive action protection system which is actuated in a way which is appropriate for the situation.

To achieve the above-mentioned object, the invention provides a preventive action protection system including safety devices which are actuated as a function of features formed from input variables of a safety sensor system in a data evaluation and control device, wherein the features are each assigned a specific weighting relating to the criticality of the driving state. When a critical driving state is detected, the data evaluation and control device actuates at least one safety device which is assigned to the driving state.

In this way, the accident criticality can be detected with a corresponding predictive driving state sensor system before the contact time when there is, for example, a frontal impact or rear impact, if the features which relate to such a collision have correspondingly high specific weighting and thus can be easily differentiated from data which is less relevant for the criticality of the driving state.

Such weighting of features advantageously takes up very little storage space and computing power in the data evaluation and control device, and thus definitive information may be obtained very quickly and, correspondingly, time is gained for the triggering of the suitable safety devices.

Such actuation of safety devices can advantageously be implemented with very little financial outlay in a triggering algorithm for safety devices if the algorithm operates in the vehicle as a function of a predictive sensor system.

In one exemplary embodiment of the invention, a superordinate criticality is formed from the specific weightings of a plurality of features and is compared with a triggering threshold. The superordinate criticality can represent, for example, the criticality in the longitudinal direction of the vehicle, if the features which are decisive for this (e.g., a remaining time up to the collision) are taken into account, or a criticality in the lateral direction if the superordinate criticality is formed from the weightings of the features which are decisive for this, (e.g., lateral deviation from a potential collision object).

In an exemplary embodiment of the invention, the superordinate criticality represents the overall criticality of a sensed collision object, in which case, when there is a plurality of sensed collision objects, a corresponding number of superordinate criticalities can be formed and compared with one another.

The features may be formed from input variables which are stored in a memory over a defined period of time, in which case profiles of the input data or input variables are observed, for example, as which positions and speeds of physical objects serve relative to the vehicle.

In order to make available the input data, the safety sensor system can include a driving state sensor system which is configured in a variety of ways and which is equipped, for example, with a steering angle sensor, a pedal travel sensor, a brake pressure sensor, wheel speed sensor, an acceleration sensor, a yaw rate sensor and/or a distance sensor.

Important input data for controlling safety devices always represents the data which is made available by a vehicle surroundings detection device which is associated with the safety sensor system. In one expedient configuration, the vehicle surroundings detection device can operate on a radar basis even if other optoelectronic or image-processing systems can be applied to implement the preventive action protection system which is configured according to the invention.

In one simple configuration of the safety sensor system, the vehicle surroundings detection device can have two radar sensors on the front of the vehicle and two on the rear of the vehicle, the sensors covering the region in front of the vehicle and the rear part behind the vehicle, respectively. The radar sensors can usually operate in the 24 GHz range and determine not only the x position but also the y position of an object in front of or behind the motor vehicle. The y position can be determined directly here by angular sensing with a pattern detection method.

If, for example, ten targets are sensed per measurement and per sensor by each wheel sensor, when there are two sensors on the front of the vehicle the vehicle's surroundings detection device supplies twenty angle data items and twenty distance data items for the ten targets per measurement, as a result of which, given a sampling rate in a range of, for example, less than 30 milliseconds, sufficient accuracy for predicting crash conditions is provided.

In one exemplary embodiment of the invention, such radar sensors are used to determine, from position data of a collision object in a defined period of time, a direction vector by which the position of the collision object is predicted. The direction vector can be estimated here from the stored position data using simple mathematical methods, for example, by a regression line.

The feature obtained in this way relating to the position of the collision object can then be weighted according to the invention.

Alternatively, the position of a sensed object can also be determined from the measured distances by triangulation. To do this it is necessary for an object whose precise position is to be determined to lie in the overlapping range of at least two radar sensors. In this context, the area in which an object can be sensed by a radar sensor depends on a radar cross section (RCS), which can be considered as the reflectivity of an object for radar waves.

A further possible way of sensing the position of an object by radar sensors is to track the time profile of the position of a sensed object, referred to as a tracking method. Such a method which is described, for example, in German patent document DE 199 49 409 A1, supplies good results when there is approximately constant movement of the sensed objects without excessively large dynamic changes.

In critical driving situations with a highly dynamic behavior, a device for sensing the position of objects in the surroundings of a vehicle, such as is described in German patent application DE 103 26 431 which is published after the priority date of the present document and to whose entire contents reference is made, is also advantageous.

In German patent application DE 103 26 431, it is proposed that position information relating to objects in the vicinity of the vehicle are derived by a comparison of input values which are supplied by sensors with data records which are stored in a memory unit. The input values contain, for example, distance data and Doppler speeds. Doppler speeds are the speeds of an object relative to a sensor, which the sensor itself determines from a Doppler measurement and outputs. The data stored in the memory unit include reference data records which represent objects in a defined spatial area in the vicinity of the vehicle with their precise positions. To accurately determine the position of an object sensed by the sensors, a comparison of the input values as supplied by the sensors with the reference data records is performed within the scope of a classification process. Using the position of the object relative to the vehicle which is determined in this way, it is possible to decide whether a sensed object is in an area for which a collision with the object is to be expected. In particular, it becomes possible to differentiate whether an obstacle is expected to be passed or hit.

The input variables obtained in this way may be stored, together with other input variables such as position components and speed components, steering wheel angle, etc., in a memory of the data evaluation and control unit and used to calculate variables derived therefrom, which variables are obtained from the development of the respective input variable over an observed time window.

The data evaluation and control device of the preventive action protection system can be a data processing device of a driving stabilization system of the motor vehicle which is frequently present in modern motor vehicles. As an alternative, it is of course also possible to use a separate data processing device.

Features which relate to a specific driving state or a driver reaction can be determined from the input data. For example, a number of specific features which are relevant to the accident criticality may be formed for each potential collision object found by the vehicle surroundings detection device.

Such features include, in particular, a position of a collision object which can be predicted, for example, by a direction vector, a remaining time up to the impact, an offset of a collision object in the lateral (y) direction, of the motor vehicle, and a relative velocity between a collision object and the motor vehicle.

The relative velocity, which may be calculated from the change in distance between two measurement cycles, with the distance or Doppler speed being measured in each measurement cycle, can itself be a feature or serve as an input variable for other features such as the remaining time up to the collision.

After inventive weighting of the correspondingly selected features and determination of a superordinate criticality, the criticality can be subjected to filtering in the data evaluation and control device over an adjustable time window before the comparison with a triggering threshold, in order to minimize the risk of incorrect triggerings.

After a triggering decision, the actuation of the corresponding safety device can be made more precise and adapted to the respective situation if it takes place as a function of physical variables of a vehicle occupant which are determined. These include, in particular, the size of vehicle occupants and their weight. These data items can be determined by a weight detection device and a body size detection device connected to the data evaluation and control device. The weight detection device may be integral with a seat occupation detection device, and the body size detection device may be integral with a seat position sensor system and an optical, head position determining device, for example.

With such devices, which are to a certain extent already installed on a series production basis, it is also possible to determine the position of a vehicle occupant in the vehicle, which information is also used to actuate the safety device in one advantageous configuration of the invention.

It is possible for specific safety devices to remain activated only from a specific vehicle velocity and for their actuators to remain actuated until the vehicle velocity has reached a very low value of, for example, 3 km/h.

Other objects, advantages and novel features of the present invention will become apparent from the following detailed description of the invention when considered in conjunction with the accompanying drawings.

DETAILED DESCRIPTION OF THE DRAWINGS

Figure 1:
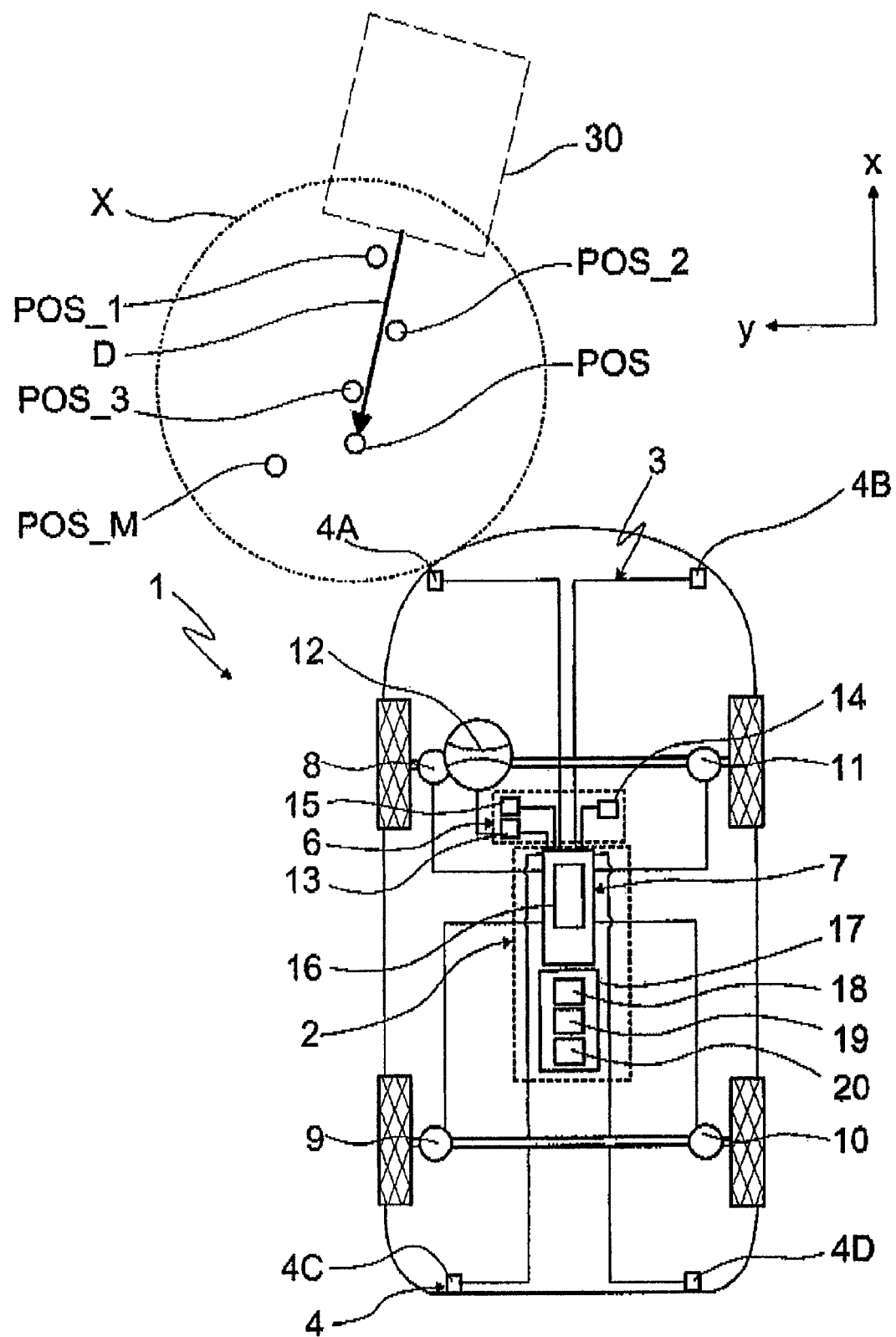
FIG. 1 is a highly schematic plan view of a motor vehicle with a preventive action protection system embodied according to the invention.

FIG. 1 is a schematic illustration of a motor vehicle 1 which can be embodied as a passenger car or as a utility vehicle and which is equipped with a preventive action protection system 2 which is embodied according to the invention.

The preventive action protection system 2 is connected at the input end to a safety sensor system 3 which includes a vehicle surroundings detection device 4 and a driving state sensor system 6.

The vehicle surroundings detection device 4 is equipped with two radar sensors 4A, 4B on the front of the vehicle and two further radar sensors 4C, 4D on the rear of the vehicle. These are what are referred to as short distance radar sensors which operate with a carrier frequency of 24 GHz and cover, for example, a range of 20 meters and are configured to sense an angle in the y direction.

Such radar sensors can also be components of an electronic parking aid and also be installed in relatively large numbers in the region of a bumper. Furthermore, in a further embodiment, a long distance radar sensor with a range of, for example, 150 meters, such as is also used in systems for adaptive distance control which are also referred to as adaptive cruise control (ACC), can also be provided in a central position on the front of the vehicle.

The driving state sensor system 6 is configured to acquire longitudinal dynamic and lateral dynamic driving state information, inter alia, for detecting emergency braking and panic braking, oversteering and/or understeering of the motor vehicle 1. For these purposes, use is made, inter alia, of information or data which is supplied by wheel speed sensors 8, 9, 10 and 11, by a Steering angle sensor 13 arranged in the region of a steering wheel 12, by a longitudinal acceleration sensor 14 and by a lateral acceleration sensor 15.

The driving state sensor system 6 communicates with a driving dynamics functionality 7 such as an anti-lock brake system and/or an electronic stability program, into which a data evaluation and control device 16 of the preventive action protection system 2 is integrated.

During normal operation of the motor vehicle, the driving state sensor system 6 can, for this purpose, analyze further important driving dynamics variables such as a vehicle velocity, a yaw rate, a spring compression travel and spring extension travel, the level of the vehicle, an accelerator pedal movement, an accelerator pedal position, a brake pedal position, brake pedal movement, a steering wheel speed and/or a steering wheel acceleration. In this context, actual values of these variables are compared with predefined setpoint values and threshold values. On the basis of these comparisons, the anti-lock brake system and/or the electronic stability program, for example, are activated and have the function of supporting the driver of the motor vehicle in critical driving situations to avoid an accident.

To use or activate the preventive action protection system 2, the information obtained from the safety sensor system 3 is evaluated in the data evaluation and control device 16 in such a way that a comparison with a triggering threshold value S takes place, at least one selection of existing safety devices 17 being activated when the triggering threshold value S is exceeded.

In the present case, the safety devices 17 may include a reversible seatbelt pretensioner 18, restraining upholstered elements 19 and an actuator for actuating an electronic seat adjustment device 20. The vehicle seats or their components may be placed, as a function of their occupation, in an orientation which provides the greatest possible safety for the respective vehicle occupant in any accident in which the motor vehicle 1 may be involved.

The safety devices can be all known controllable vehicle occupant protection devices and also protection devices for another party to the collision, for example, pedestrians.

The triggering algorithm which is provided for the safety devices 17 and which is stored in the data evaluation and control device 16 is described by way of example below with reference to FIG. 2.

Figure 2:
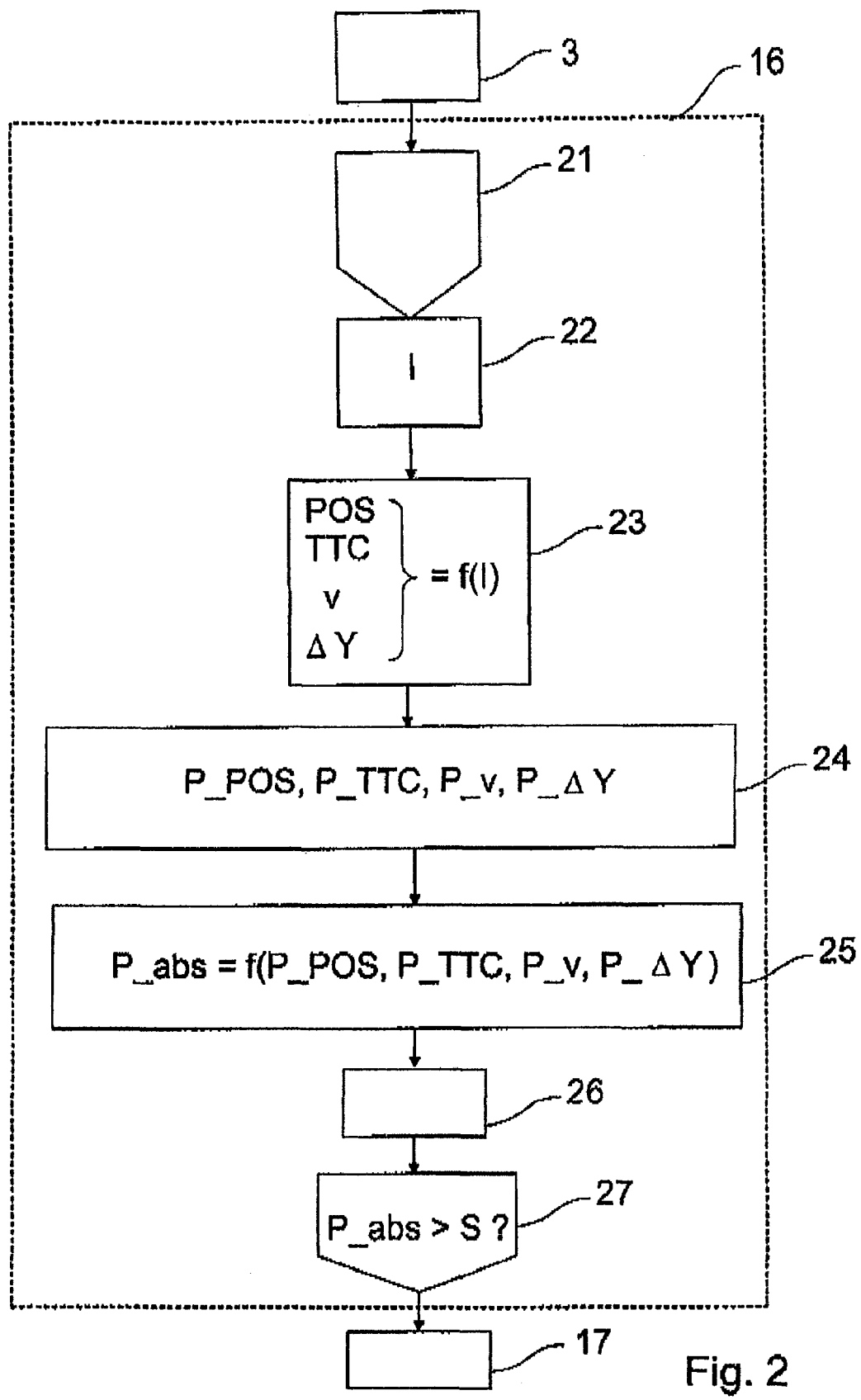
FIG. 2 is a simplified block diagram of an algorithm which is implemented in the motor vehicle which is configured according to the invention, the algorithm being used to actuate a preventive action protection system.

FIG. 2 is a block diagram with essential steps of the triggering algorithm, input variables I, for example, position and speed components, a steering wheel angle or the like, being sensed by the corresponding sensors in a first step 21.

In a subsequent step 22, the input variables I are stored in a memory of the data evaluation and control device 16 and evaluated in terms of their history, and thus form input variables I which serve, in a subsequent step 23, to form features which relate to a criticality of a collision object 30 illustrated in FIG. 1.

In the present exemplary embodiment, a position POS of the collision object 30, a remaining time TTC up to the impact of the collision object 30, an offset $\Delta Y$ of the collision object 30 in the lateral or y direction of the motor vehicle 1 and a relative velocity v between the collision object 30 and the motor vehicle 1 are formed, as features, from input variables stored in the memory of the data evaluation and control device 16 over a defined period of time.

The features are formed with simple mathematical methods, for example, the position POS of the collision object 30 is predicted by a direction vector D which is estimated by a regression line from position data POS_1, POS_2, POS_3 which is represented in FIG. 1 and is determined over several measurement cycles in a defined period of time.

As is apparent from the flowchart in FIG. 2, after the features POS, TTC, ΔY, v have been formed, these features are each assigned a specific weighting P_POS, P_TTC, PΔY, P_v relating to the criticality of the driving state. This weighting, which is shown in more detail in FIG. 3 in relation to the remaining time TTC up to the impact, in FIG. 4 in relation to the offset ΔY in the y direction of the motor vehicle 1, and in FIG. 5 in relation to the relative velocity or approach velocity between the collision object 30 and the motor vehicle 1, is carried out by freely definable nonlinear characteristic curves.

Figure 3:
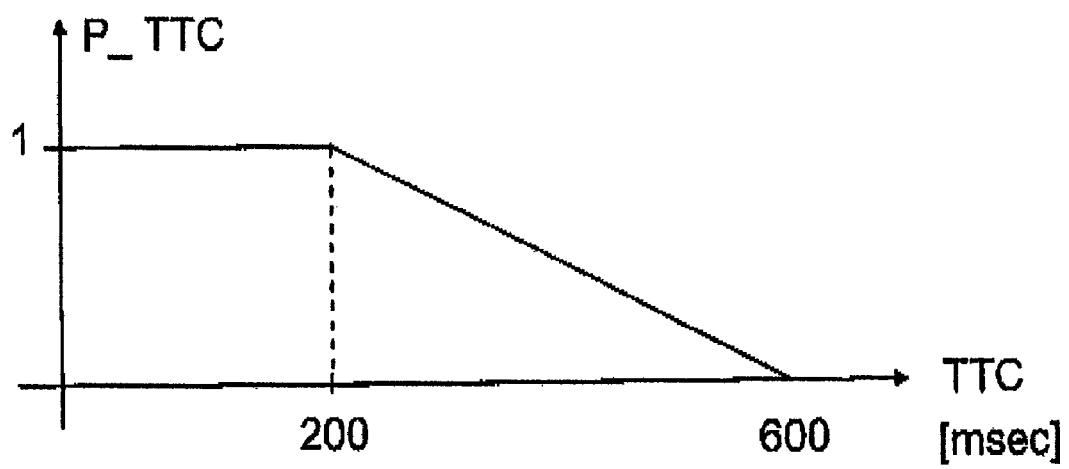
FIG. 3 is a qualitative diagram which shows the specific weighting of the criticality of a remaining time up to the collision.

For example, referring to FIG. 3, the maximum accident criticality is assumed for the remaining time TTC up to the impact for a predefined minimum time period of, for example, 200 milliseconds, and the corresponding weighting P_TTC with the maximum value "1" is assumed. For a time period longer than 200 milliseconds, a characteristic curve for correspondingly lower values of the weighting P_TTC of the remaining time TTC is assumed for the accident criticality of the driving state, in which case the minimum criticality is assumed, for example, when there is a time window longer than 600 milliseconds.

Figure 4:
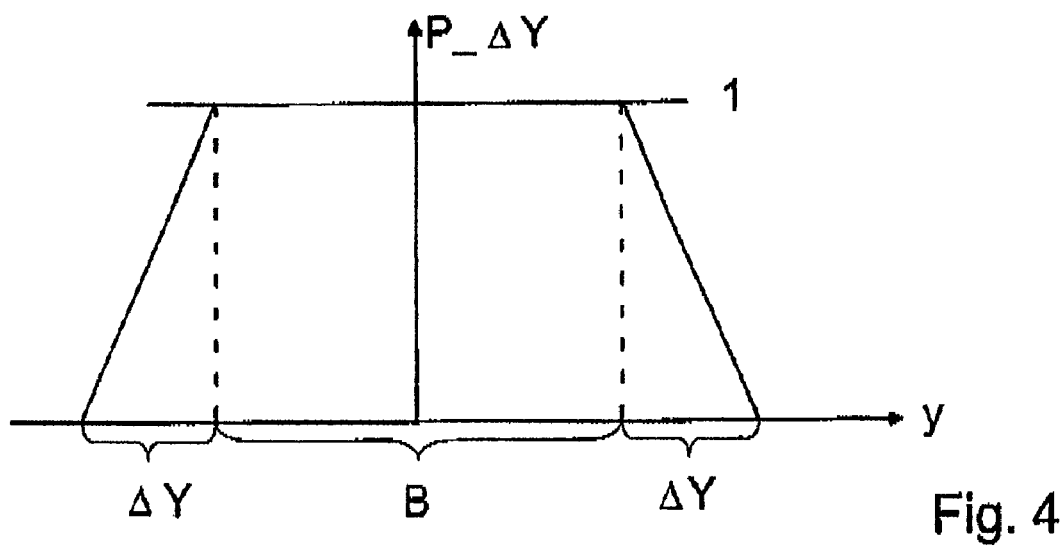
FIG. 4 is a qualitative diagram which shows the specific weighting of the criticality of an offset of a collision object in the lateral direction of the motor vehicle.

Referring to FIG. 4, it is clear that the lower the calculated lateral offset ΔY from the vehicle side, the higher the weighting P_ΔY for the criticality of the lateral offset ΔY of the collision object 30 in relation to the motor vehicle 1. Correspondingly, given a vehicle width B and zero lateral offset ΔY, the maximum weighting P_ΔY with the value "1" is selected the weighting dropping to a value zero as the lateral distance from the motor vehicle 1 increases. The steering movement in the motor vehicle 1, which correspondingly changes the offset ΔY from the collision object 30 can also be taken into account by the lateral offset ΔY.

Figure 5:
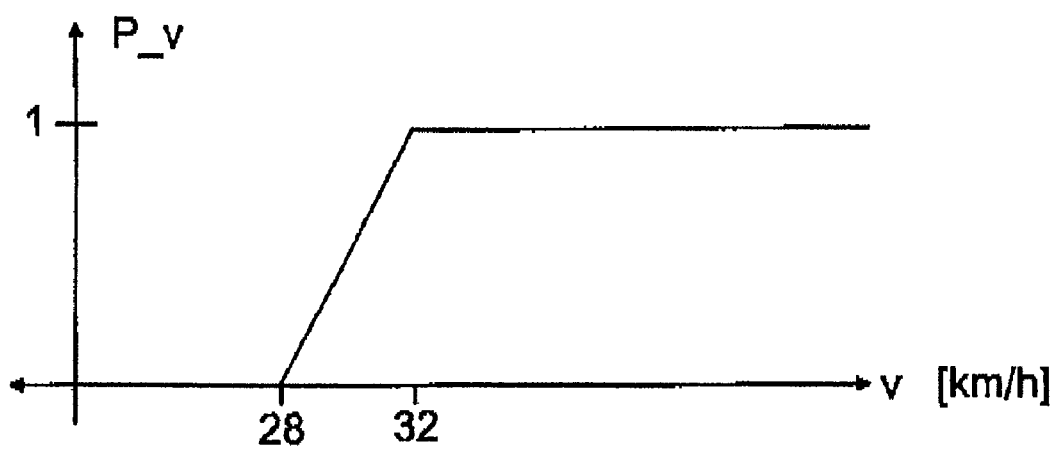
FIG. 5 is a qualitative diagram which shows the specific weighting of the criticality for a relative velocity between a collision object and the motor vehicle.

In FIG. 5, it is clear that given a positive relative velocity, which corresponds to the collision object 30 approaching the motor vehicle 1, an increased accident criticality is seen starting from a certain value of, for example, 28 km/h, and an increasing characteristic curve for the weighting P_v of the relative velocity v in relation to the accident criticality is thus predefined. The characteristic curve has the maximum value "1" at a value of the relative velocity v of, for example, 32 km/h.

In the embodiment shown, the specific weighting P_POS for the accident criticality, which is assigned to the position POS of the collision object 30, is dependent on whether the predicted position FOS lies, on the one hand, in a predefined fuzzy region X and, on the other hand, deviates from a measured position POS_M. The weighting P_POS of the criticality of the position POS of the collision object 30 is increased if the predicted position POS lies in the fuzzy region X and/or the greater the degree of deviation of the measured position POS_M of the collision object 30 from its predicted position.

In the present embodiment, the fuzzy region X is a function of the distance from the collision object 30, the fuzzy region X being greater the closer the collision object 30 is to the motor vehicle 1. In this way, with the weighting P_POS of the criticality of the position POS of the collision object 30, it is also possible to take into account faults in the sensing of objects such as can be caused, for example, by humid air, reflections, etc.

The weighting of the direction vector D or of the position POS which is determined therefrom is carried out directly in the embodiment shown, i.e., without comparison of the direction vector D with other vectors stored in a memory so that the weighting requires only very little expenditure in terms of computation and time.

If the selected features are assigned their specific weighting P_POS, P_TTC, P_ΔY, P_v, it is possible, in a further step 25 of the triggering algorithm shown in FIG. 2, for the individual weightings P_POS, P_TTC, P_ΔY, P_v to be logically combined and for a super-ordinate criticality P_abs to be formed from these weightings. In a very simple embodiment, the logic combination can be a multiplication according to the equation $$P\_abs = P\_POS * P\_TTC * P\_\Delta Y * P\_v,$$

The superordinate criticality P_abs obtained in this way corresponds to the overall criticality of the collision object 30 for a possible collision.

If a number of collision objects are sensed in a measurement cycle, only the collision object with the maximum overall criticality P_abs is tracked further. As an alternative to this, a plurality of objects, for example, three of ten sensed objects which have the maximum overall criticality of the ten sensed objects can also be tracked, with a correspondingly higher computational expenditure.

To eliminate brief faults which can occur, for example, due to noise in the transmission of data which is dependent on the weather or on the state of the road, the calculated superordinate criticality or overall criticality P_abs is filtered in a further method step 26 during an adjustable time window or over a specific number of measurement cycles, a mean value filter of four measurement cycles being used here.

The overall criticality P_abs which is now filtered is then compared with a triggering threshold S in a differentiating function 27, in which case, when the triggering threshold S is exceeded, the assigned safety device 17 is triggered. This triggering threshold S, which can have here, for example, a value of 0.7 (=70%) can vary depending on the type of vehicle and the current operating and ambient conditions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. In a motor vehicle, a preventive action protection system comprising:
    a data evaluation and control device including a safety sensor system; and
    safety devices which are actuated as a function of features based on input variables of the safety sensor system, wherein:
    when a critical driving state is detected, the data evaluation and control device actuates at least one safety device which is assigned to the driving state, and
    each of the features is assigned a specific weighting based on a criticality of the driving state,
    wherein a superordinate criticality is formed from the specific weightings of a plurality of the features and is compared with a triggering threshold.

2. The preventive action protection system as claimed in claim 1, wherein the superordinate criticality represents an overall criticality of a sensed collision object.

3. The preventive action protection system as claimed in claim 1, wherein the superordinate criticality is filtered by an adjustable time window in the data evaluation and control device.

4. The preventive action protection system as claimed in claim 1, wherein the features are based on input variables stored in a memory over a defined period of time.

5. The preventive action protection system as claimed in claim 1, wherein the features comprise a position of a collision object.

6. The preventive action protection system as claimed in claim 5, wherein a direction vector from which the position of the collision object is predicted, is determined from position data of the collision object in a defined period of time.

7. The preventive action protection system as claimed in claim 5, wherein a weighting of a criticality of the position of the collision object is increased if a predicted position of the collision object lies in a predefined region.

8. The preventive action protection system as claimed in claim 5, wherein weighting of the criticality of the position of the collision object is increased if a measured position of a collision object deviates from a predicted position.

9. The preventive action protection system as claimed in claim 1, wherein the features comprise a remaining time before impact.

10. The preventive action protection system as claimed in claim 1, wherein the features comprise an offset of a collision object in the lateral direction of the motor vehicle.

11. The preventive action protection system as claimed in claim 1, wherein the features comprise a relative velocity between a collision object and the motor vehicle.

12. The preventive action protection system as claimed in claim 2, wherein the features are based on input variables stored in a memory over a defined period of time.

13. The preventive action protection system as claimed in claim 2, wherein the features comprise a position of a collision object.

14. A method for protecting occupants of a motor vehicle that includes a preventive action protection system, comprising:
assigning a weighting to each of a plurality of features that are based on input variables of a safety sensor system;
detecting a critical driving state of the motor vehicle; and
actuating a safety device assigned to the detected critical driving state;
wherein each of the weightings of the plurality of features is assigned, based on a criticality of the critical driving state,
wherein a superordinate criticality is formed from the weightings of the plurality of the features and is compared with a triggering threshold.

* * * * *